(12) United States Patent
Schlipf et al.

(10) Patent No.: US 10,354,553 B2
(45) Date of Patent: Jul. 16, 2019

(54) EXPLORATION MAPS FOR VISUALIZING SOFTWARE PRODUCT KNOWLEDGE

(71) Applicant: ENTIT SOFTWARE LLC, Sanford, NC (US)

(72) Inventors: Carsten Schlipf, Boeblingen (DE); Birgitta Hettler, Boeblingen (DE); Volker Gärtner, Boeblingen (DE); Marc Philipp Werner, Boeblingen (DE); Frank Vosseler, Boeblingen (DE); Jörn Schimmelpfeng, Boeblingen (DE); Katharina Goettlicher, Boeblingen (DE); Radi Dimitrov Hadzhiyski, Boeblingen (DE); Chris Tracey, Bracknell (GB)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 721 days.

(21) Appl. No.: 14/765,319

(22) PCT Filed: Apr. 3, 2013

(86) PCT No.: PCT/US2013/035164
§ 371 (c)(1),
(2) Date: Jul. 31, 2015

(87) PCT Pub. No.: WO2014/163637
PCT Pub. Date: Oct. 9, 2014

(65) Prior Publication Data
US 2016/0019814 A1    Jan. 21, 2016

(51) Int. Cl.
| | | |
|---|---|---|
| *G09B 19/00* | (2006.01) | |
| *G06F 8/71* | (2018.01) | |
| *G09B 5/02* | (2006.01) | |
| *G06Q 10/06* | (2012.01) | |
| *G06F 9/54* | (2006.01) | |
| *G06F 9/451* | (2018.01) | |

(52) U.S. Cl.
CPC ........... *G09B 19/0053* (2013.01); *G06F 8/71* (2013.01); *G06F 9/453* (2018.02); *G06F 9/542* (2013.01); *G06Q 10/067* (2013.01); *G09B 5/02* (2013.01)

(58) Field of Classification Search
CPC ....... A63F 13/00; A63F 13/822; G09B 19/00; G09B 19/0053; G09B 5/02; G06F 3/04815; G06F 8/71
See application file for complete search history.

(56) References Cited

U.S. PATENT DOCUMENTS

| | | | |
|---|---|---|---|
| 7,865,829 B1 | 1/2011 | Goldfield | |
| 2002/0113809 A1* | 8/2002 | Akazawa | G06F 3/04815 |
| | | | 715/706 |

(Continued)

FOREIGN PATENT DOCUMENTS

CN    102722361    10/2012

OTHER PUBLICATIONS

Extended European Search Report received in EP Application No. 13881066.8, dated Sep. 26, 2016, 9 pages.

(Continued)

*Primary Examiner* — Jerry-Daryl Fletcher (57) ABSTRACT

Example embodiments relate to providing exploration maps for visualizing enterprise product knowledge. In example embodiments, a system obtains a software exploration map including feature areas, where each feature area is associated with activities and a grouping of features in a software product. At this stage, the system may detect completion of an activity by a user of the software product. The system may then modify a knowledge level of the user in the feature area based on the completion of the activity.

20 Claims, 4 Drawing Sheets

(56) References Cited

U.S. PATENT DOCUMENTS

| | | |
|---|---|---|
| 2002/0154153 A1 | 10/2002 | Messinger et al. |
| 2004/0162798 A1 | 8/2004 | Mamoto et al. |
| 2006/0047544 A1 | 3/2006 | Habon |
| 2006/0047672 A1 | 3/2006 | Habon |
| 2008/0124687 A1* | 5/2008 | Post ................ A61B 5/16 434/219 |
| 2009/0089751 A1 | 4/2009 | Raikes |
| 2011/0320943 A1 | 12/2011 | Wade |
| 2012/0157212 A1* | 6/2012 | Kane ................ A63F 13/10 463/42 |
| 2012/0311474 A1 | 12/2012 | McPherson et al. |

OTHER PUBLICATIONS

Coco Systems Ltd. (main web), VisiMap Professional 4.2, 5 pages http://coco.co.uk/prodvmpro.html#NewFeatures.

Lukoit, K. et al., Tracegraph: Immediate Visual Location of Software Features, 10 pages, Pensacola, Florida, USA https://www google com/url?sa=t&rct=j&q=&esrc=s&source=web&cd=3&cad=rja&sqi=2&v.

Natali, A. et al., Model-driven Generation of Graphical Maps for e-contents, Nov. 2, 2008, 10 pages, Cesena, Italy http://ceur-ws org/Vol-436/paper6 pdf.

Telea, A. et al., Case Study: Visual Analytics in Software Product Assessments, Sep. 25-26, 2009, pp. 65-72, the Netherlands http://www cs rug nl/~alext/PAPERS/VisSoft09/paper3 pdf>.

Slideshare https://www.slideshare.net/ervler/gamification-how-effective-is-it, Gamification—How Effective is it? Sep. 26, 2011 (49 pages).

Wikipedia, Game Mechanics dated on or before Mar. 18, 2013 (11 pages).

Wikipedia, Gamification dated on or before Apr. 2, 2013 (9 pages).

Zichermann, Gabe, Gartner Adds Gamification to its Hype Cycle, Aug. 12, 2011 (2 pages).

* cited by examiner

EXPLORATION MAPS FOR VISUALIZING SOFTWARE PRODUCT KNOWLEDGE

BACKGROUND

A software product is typically provided with a user manual to instruct a user on proper usage of the software product. Enterprise software products in particular are complicated and include complex requirements and workflows, which have a steep learning curve. In some cases, software training is provided to users in the form of hands-on instruction with the software product. In this case, the users may be guided through practice exercises in order to learn how to properly use the features of the software product.

BRIEF DESCRIPTION OF THE DRAWINGS

The following detailed description references the drawings, wherein.

DETAILED DESCRIPTION

As discussed above, manuals and training are provided to users of a software product to instruct the users on its proper use. For example, help documentation that is accessible from the software product may be provided to the users. In this example, the display of the help documentation may be context sensitive so that information that is relevant to the user's current use of the software product is displayed. However, such help documentation is typically passive and only accessed if a user is proactively seeking help for a software product. Accordingly, users may often overlook new or previously unused features in a software product after they have achieved a level of proficiency that allows the users to complete their tasks.

Example embodiments disclosed herein provide software exploration maps for visualizing software product knowledge. For example, in some embodiments, a system obtains a software exploration map including feature areas that are each associated with a grouping of features in a software product and determines activities associated with one of the feature areas. When completion of an activity by a user is detected, the system modifies a knowledge level of the user in the related feature area.

In this manner, example embodiments disclosed herein gamify the process of instructing a user on the proper use of a software product. Specifically, by providing a software exploration map that visually depicts the user's progress, the user is encouraged to explore unknown features of the software product. Further, the user is highly motivated to complete the training process so that he can increase his knowledge ranking and/or obtain achievements. The software exploration map allows the progress of the user to be visualized in a familiar, geographic-like format, thereby allowing the user and his manager to easily determine the user's progress.

Figure 1:
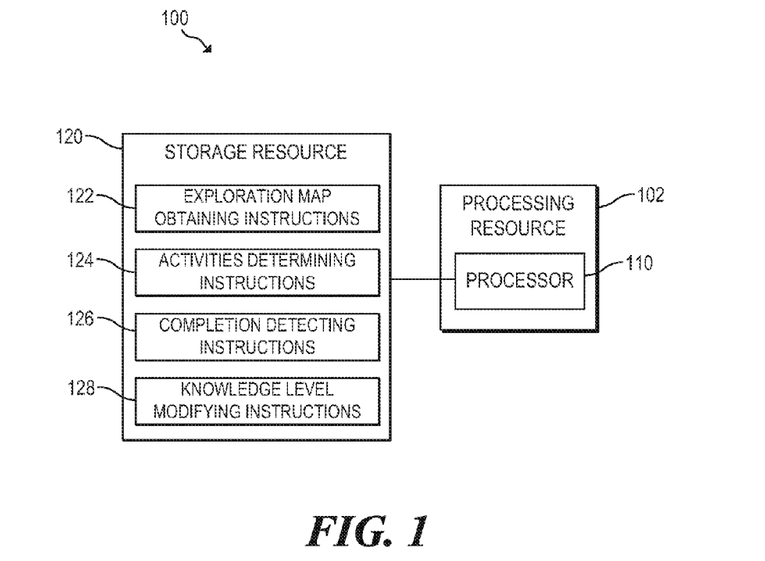
FIG. 1 is a block diagram of an example system for software exploration maps for visualizing software product knowledge.

Referring now to the drawings, FIG. 1 is a block diagram of an example system 100 for providing software exploration maps for visualizing software product knowledge. The system 100 can include a processing resource 102 such as a processing unit in a notebook computer, a desktop computer, an all-in-one system, a tablet computing device; multiple computing devices in a distributed system; or any other electronic device suitable for providing software exploration maps. In the embodiment of FIG. 1, processing resource includes a processor 110.

Processor 110 may be one or more central processing units (CPUs), microprocessors, and/or other hardware devices suitable for retrieval and execution of instructions stored in storage resource 120. In some cases, processor 110 may include multiple CPUs that are distributed across multiple computing devices. Processor 110 may fetch, decode, and execute instructions 122, 124, 126, 128 to enable providing software exploration maps for visualizing software product knowledge. As an alternative or in addition to retrieving and executing instructions, processor 110 may include one or more electronic circuits comprising a number of electronic components for performing the functionality of one or more of instructions 122, 124, 126, 128.

System 100 may also include a storage resource 120 that may be any electronic, magnetic, optical, multiple storage devices in a distributed system, or other physical storage device that stores executable instructions. Thus, storage resource 120 may be, for example, Random Access Memory (RAM), an Electrically-Erasable Programmable Read-Only Memory (EEPROM), a storage drive, an optical disc, and the like. As described in detail below, storage resource 120 may be encoded with executable instructions for providing software exploration maps for visualizing software product knowledge. In some cases, the storage resource 120 may be accessible as a cloud resource, where an installation package including the executable instructions or output of the executable instructions may be obtained and used by processing resource 102.

Exploration map obtaining instructions 122 may obtain a software exploration map for a software product. For example, a software exploration map may be obtained from an application configured to generate exploration maps for software products. In another example, the software exploration map may be generated manually by an administrator for use by processing resource 102. A software exploration map may be a geographic-like presentation of a user's product knowledge of a software product. Specifically, the software exploration map may include geometric shapes that are representative of feature areas in the software product. A feature area of a software product may be a grouping of features of the software product. For example, word processing software may have feature areas such as printing, formatting, editing, layouts, references, etc. In another example, enterprise collaboration software may have feature areas such as content, searching, sharing, customizations, etc.

Activities determining instructions 124 may determine activities that are associated with a feature area of a software exploration map. An activity may describe a set of actions to be performed in the software product. For example, if the software product is word processing software, an activity may be to add a footnote to a document that is currently being edited by the user. In another example, if the software product is enterprise collaboration software, an activity may be to add and share content with other users. An activity may be represented on a software exploration map as a graph node within a geometric shape that represents a feature area, where related graph nodes may be connected by edges.

Completion detecting instructions 126 may detect when a user of the software product completes an activity in the software exploration map. For example, the software product may provide an application programming interface (API) that allows the software product to obtain activity data of a user. In this example, the activity data may describe the actions of the user within the software product. In another example, the software product may actively provide notifications of completed activities to completion detecting instructions 126.

Knowledge level modifying instructions 128 may modify the knowledge level of a user for a software product based on the user's completion of activities in the software exploration map. Specifically, the knowledge level may be a composite score of the user that reflects the quantity of activities that have been completed by the user. An overall knowledge level may be determined for the software product, and an area knowledge level may be determined for a particular feature area in the software product. When a user completes an activity, the user's knowledge level may be increased to reflect the completed activity. For example, if a feature area includes ten activities, the user's area knowledge level for the feature area may be determined as the proportion of the ten activities that have been completed by the user (e.g., 10% if one activity has been completed, 20% if two activities have been completed, etc.).

Figure 2:
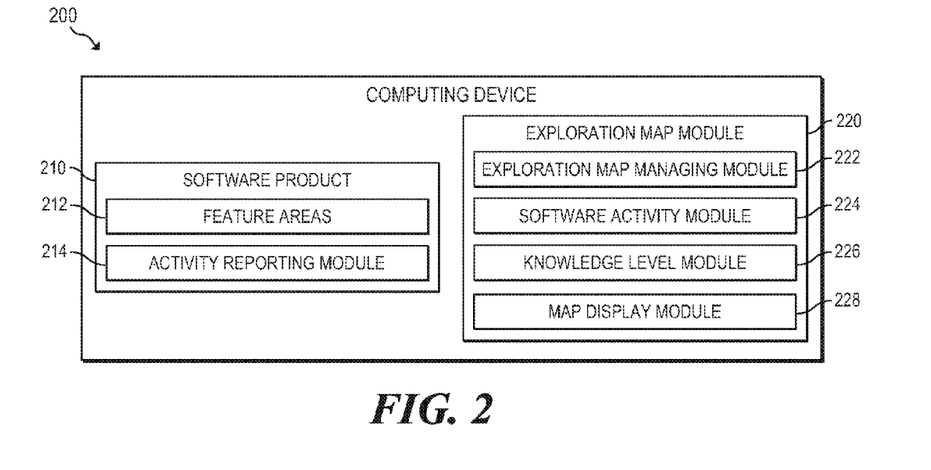
FIG. 2 is a block diagram of an example computing device including modules for managing software exploration maps for visualizing software product knowledge.

FIG. 2 is a block diagram of an example computing device 200 including modules for performing aspects of providing software exploration maps for visualizing software product knowledge. As with processing resource 102 of FIG. 1, computing device 200 may be any electronic device suitable for providing software exploration maps.

As illustrated in FIG. 2 and described in detail below, computing device 200 may also include a number of modules 210-228. Each of the modules may include a series of instructions encoded on a machine-readable storage medium and executable by a processor of computing device 200. In addition or as an alternative, each module 210-228 may include one or more hardware devices comprising electronic circuitry for implementing the functionality described below. In some cases, the modules 210-228 may be implemented as a distributed system across multiple computing devices.

Software product 210 may be software configured to provide functionality for a user. Examples of software products may include, but are not limited to, word processing software, social sharing software, data entry software, database management software, data analysis software, etc. Software product 210 may include modules as discussed below for providing functionality to a user of computing device 200.

Feature areas 212 of software product 210 may be groupings of functionality provided by software product 210. The groupings of functionality for the feature areas may be based on the location of functionality in the user interface, common characteristics of functionality, etc. For example, a software product 210 with a tabbed user interface may have a feature area 212 for each tab (e.g., file, view, layout, print, etc.). In another example, a software product 210 may have a feature area 212 for each of the major data entities used by the software product 210 (e.g., friends, groups, notifications, events, etc.).

Activity reporting module 214 of software product 210 may notify third party applications of the activities of a user of software product 210. For example, the interactions of the user with software product 210 (e.g., features accessed, activities completed, etc.) may be logged and made accessible to third party applications such as exploration map module 220. An activity may include a series of actions (e.g., selecting user interface elements, creating data records, data entry, etc.) performed by the user to accomplish a task within the software product 210. In another example, the interactions of the user may be provided directly to third party applications via software notifications.

In some cases, activity reporting module 241 may be an application programming interface (API) of software product 210 for providing third party applications (e.g., exploration map module 220) with functions for accessing information and functionality of software product 210. For example, the API may provide a function that allows exploration map module 220 to access data describing the interactions of the user with software product 210. In this example, the API may be used in real-time or periodically to poll software product 210 for data describing the interactions of the user.

Exploration map module 220 may process and generate a display of software exploration maps of software products (e.g., software product 210). Although the components of exploration map module 220 are described in detail below, additional details regarding an example implementation of exploration map module 220 are provided above with respect to exploration map obtaining instructions 122, activities determining instructions 124, completion detecting instructions 126, and knowledge level modifying instructions 128 of FIG. 1.

Exploration map managing module 222 may manage software exploration maps of software products (e.g., software product 210). Specifically, exploration map managing module 222 may obtain software exploration maps and provide them for use by the other modules of exploration map module 220. For example, software exploration maps may be generated by a third party application (not shown) and then stored on computing device 200 as a file, database entries, etc. In this example, exploration map module 222 may load a software exploration map stored on computing device 200 so that it may be accessed by a user of software product 210. Exploration map managing module 222 may process the software exploration map to determine feature areas of a corresponding software product, where each of the feature areas may be represented as a geometric shape (e.g., polygon, rectangle, oval, irregular shape, three dimensional (3D) shape, etc.). Further, exploration map managing module 222 may also determine activities associated with each of the feature areas, where each of the activities may be represented as a node in an activity graph within a corresponding geometric shape of a feature area.

Software activity module 224 may monitor interactions of a user with software product 210 to determine when activities are completed by the user. For example, software activity module 224 may access log entries or receive notifications from activity reporting module 214 that describe the interactions of the user with software product 210. In another example, software activity module 224 may use an API of software product 210 to obtain data describing the interactions of the user with software product 210. The descriptions of the interactions of the user may be provided by software activity module 224 to knowledge level module 226 for use in determining knowledge levels of the user.

Knowledge level module 226 may determine knowledge levels of a user based on a software exploration map. The knowledge level of the user may reflect the user's familiarity with the software product. For example, knowledge level module 226 may determine an area knowledge level for a feature area that reflects the user's familiarity with product features within that feature area of software product 210. In another example, knowledge level module 226 may determine an overall knowledge level that reflects the user's familiarity with all product features within software product 210. In either case, the knowledge level may be determined based on the activities in a software exploration map that have been completed by the user. In some cases, each activity may be associated with a point value that is added to the user's knowledge level upon completion of the activity. Alternatively, the knowledge level may be determined as the percentage of activities that have been completed by the user. Further, each activity may be associated with an achievement, where upon completion of the activity, the user is awarded with a badge that is presented on a profile of the user in, for example, a social network.

Map display module 228 may generate a display of and allow a user to interact with software exploration maps. Specifically, the software exploration map may be displayed as geometric shapes that are representative of the feature areas of a software product. Further, activities may be represented as graph nodes within the geometric shapes of their respective feature areas. Map display module 228 may allow the user to navigate (e.g., zoom, pan, etc.) within the display of the software exploration map as if it was a geographic map. Map display module 228 may also show knowledge levels of the user in the display of the software exploration map. For example, each geometric shape for the feature areas may be color coded based on the user's area knowledge level for the respective feature area (e.g., feature areas with a higher area knowledge level may be rendered with a darker color). As the user completes activities in the software exploration map, map display module 228 updates the display of the software exploration map to reflect the modified knowledge level of the user.

May display module 228 may also allow the user to select and review information for activities in the software exploration map. For example, if a user selects an activity, map display module 228 may generate a display of a description of the activity that includes the actions that should be performed by the user to complete the activity. In this example, map display module 228 may also include a link to the software product 210 in the description, where selection of the link navigates the user to the relevant portion of the software product 210 (i.e., the portion of the software product 210 for performing the actions to complete the activity).

Generating a display may include directing a graphics device to display the exploration map or generating data that is processed and displayed by a client device. For example, map display module 228 may generate a display of a software exploration map by providing instructions to a graphics card for displaying the software exploration map on a display device such as a monitor. In another example, map display module 228 may generate display data that is transmitted to and then used by a client device to display the software exploration map. In yet another example, computing device 200 may include a graphics processing unit (now shown) that is used by map display module 228 to generate a display of the software exploration map.

Figure 3:
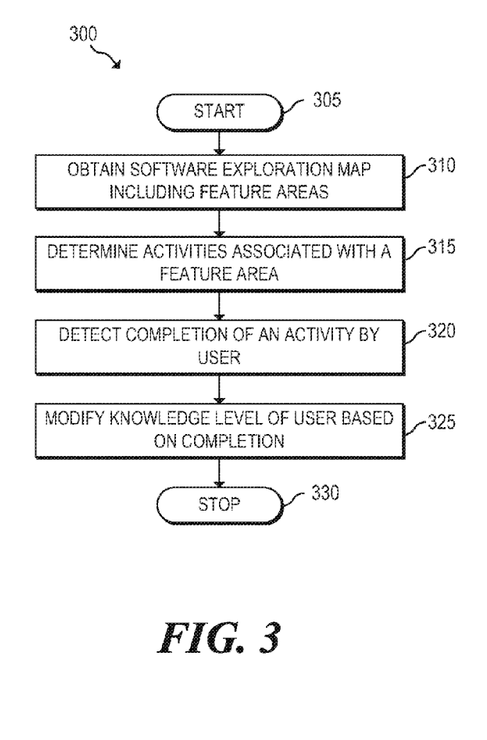
FIG. 3 is a flowchart of an example method for execution by a computing device for managing software exploration maps for visualizing software product knowledge.

FIG. 3 is a flowchart of an example method 300 for execution by a system 100 for providing software exploration maps for visualizing software product knowledge. Although execution of method 300 is described below with reference to system 100 of FIG. 1, other suitable devices for execution of method 300 may be used, such as computing device 200 of FIG. 2. Method 300 may be implemented in the form of executable instructions stored on a machine-readable storage medium, such as storage resource 120, and/or in the form of electronic circuitry.

Method 300 may start in block 305 and continue to block 310, where system 100 may obtain a software exploration map including knowledge areas for a software product. In some cases, the software exploration map may be generated by a third party application based on an automated analysis of the software product. Alternatively, the software exploration map may be wholly or partially generated manually be an administrator of the software product. Next, in block 315, system 100 may determine activities that are associated with a feature area. For example, the activities may be related to a functional grouping (e.g., editing, formatting, printing, etc.) of features within the software product.

In block 320, a completion of an activity in the software exploration map is detected by computing device 200. For example, the software product may provide a notification that describes interactions of the user, where completion of the activity is determined based on the notification. Next, in block 325, computing device 200 may modify a knowledge level of the user based on the completion of the activity. For example, points may be added to the knowledge level of the user for completion of the activity. In another example, the knowledge level of the user may increase as the proportion of activities that have been completed by the user increases. Method 300 may subsequently proceed to block 330, where method 300 may stop.

Figure 4:
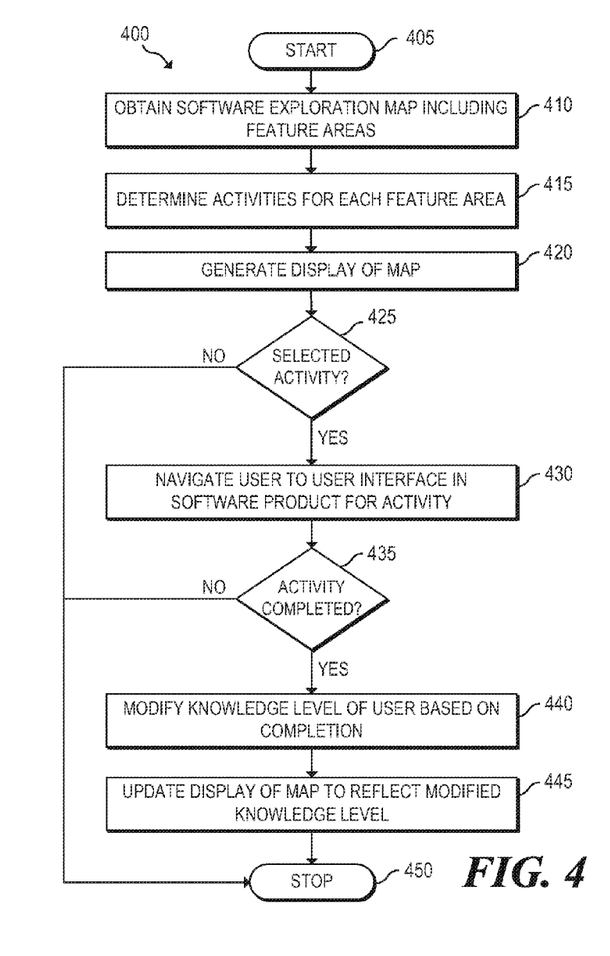
FIG. 4 is a flowchart of an example method for execution by a computing device for displaying and updating a software exploration map for visualizing software product knowledge.

FIG. 4 is a flowchart of an example method 400 for execution by a computing device 200 for displaying and updating a software exploration map for visualizing software product knowledge. Although execution of method 400 is described below with reference to computing device 200 of FIG. 2, other suitable devices for execution of method 400 may be used, such as system 100 of FIG. 1. Method 400 may be implemented in the form of executable instructions stored on a machine-readable storage medium and/or in the form of electronic circuitry.

Method 400 may start in block 405 and proceed to block 410, where computing device 200 obtains a software exploration map including feature areas for a software product. In block 415, a set of activities may be determined for each of the feature areas. Each set of activities may be in a particular grouping of functionality that is associated with a corresponding feature area of the software product. Next, in block 420, a display of the software exploration map may be generated. The feature areas may be rendered as geometric shapes, where activities are rendered as graph nodes within their respective feature areas. For example, the display of the exploration map may be rendered to resemble a geographic map, where the feature areas are displayed like countries and the activities are displayed like cities connected by roads within the feature areas.

In block 425, it is determined if an activity has been selected by the user. If an activity has not been selected by the user, method 400 may subsequently proceed to block 450, where method 400 may stop. If an activity has been selected by the user, the user may be navigated to a user interface in software product that is related to the selected activity in block 430. For example, the user may be navigated to the user interface for performing the activity in software product.

In block 435, it is determined if the activity has been completed by the user. If the activity has not been completed by the user, method 400 may subsequently proceed to block 450, where method 400 may stop. If the activity has been completed by the user, the knowledge level of the user may be modified based on the completion in block 440. For example, the user's area knowledge level for the feature area associated with the activity may be increased in response to the user completing the activity. Next, in block 445, the display of the software exploration map may be updated to reflect the modified knowledge level of the user. In this example, the geometric shape associated with the feature level of the activity may be darkened to show that the user's area knowledge level has increased. Method 400 may subsequently proceed to block 450, where method 400 may stop.

Figure 5:
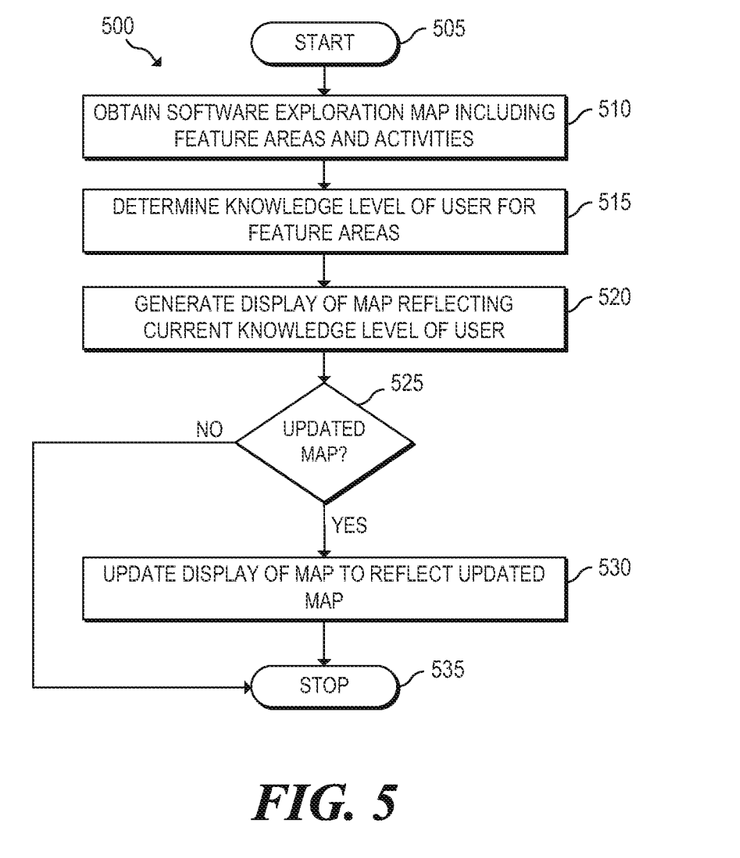
FIG. 5 is a flowchart of an example method for execution by a computing device for managing software exploration maps for visualizing software product knowledge for multiple versions of a software product.

FIG. 5 is a flowchart of an example method 500 for execution by a computing device 200 for managing software exploration maps for visualizing software product knowledge for multiple versions of a software product. Although execution of method 500 is described below with reference to computing device 200 of FIG. 2, other suitable devices for execution of method 500 may be used, such as system 100 of FIG. 1. Method 500 may be implemented in the form of executable instructions stored on a machine-readable storage medium and/or in the form of electronic circuitry.

Method 500 may start in block 505 and proceed to block 510, where computing device 200 obtains a software exploration map including feature areas. Further, a set of activities may be determined for each of the feature areas. At this stage in block 515, the current knowledge level of the user may be determined as discussed above with respect to FIG. 4. In block 520, a display of the software exploration map that reflects the current knowledge level of the user may be generated.

In block 525, it is determined if an updated software exploration map is available. Software exploration maps may be updated when the related software product is modified. For example, an updated software exploration map may be generated when a new version of a software product is created. In this example, the updated software exploration map may account for new features that have been added to the software product since the previous release of the software product. If an updated software exploration map is not available, method 500 proceeds to 535, where method 500 may stop.

If an updated software exploration map is available, computing device 200 may update the display to reflect the updated exploration map in block 530. For example, the rendering of the feature areas in the display may be updated (e.g., lightened) to reflect activities that have been added to the software exploration map to account for the new features. The updated display allows the user to quickly identify feature areas that have new features, thereby notifying the user that he should complete additional training for the new features in the software product. Method 500 may subsequently proceed to block 535, where method 500 may stop.

Figure 6A:
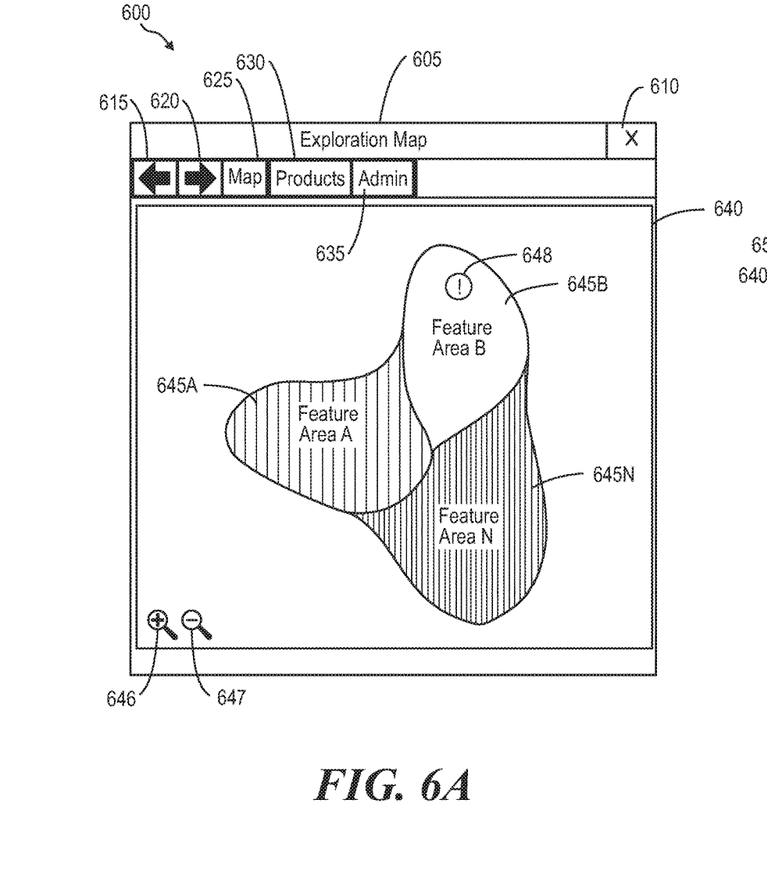
FIGS. 6A-6B are block diagrams of an example user interface for displaying a software exploration map for visualizing software product knowledge.
Figure 6B:
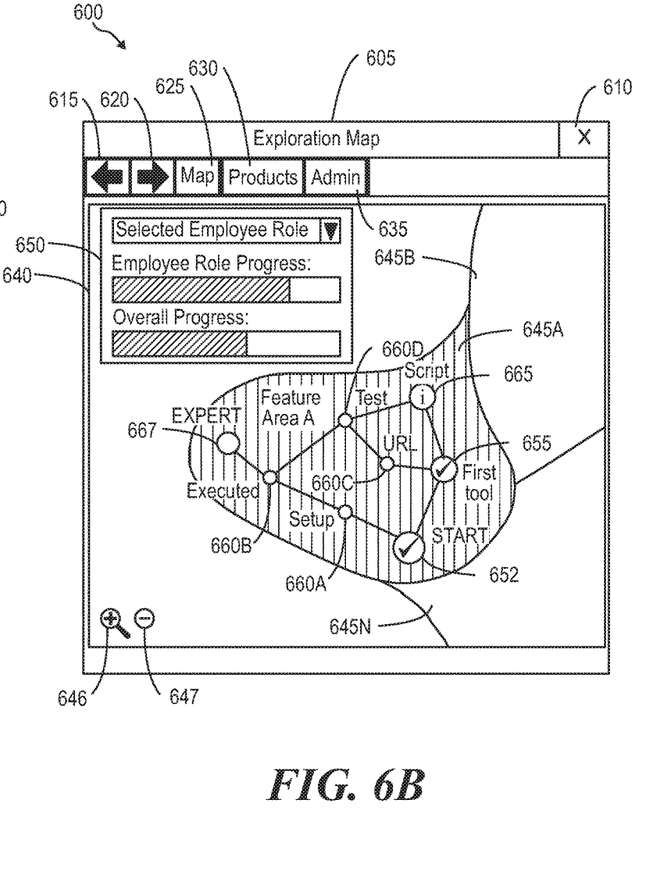

FIGS. 6A-6B are block diagrams of an example user interface 600 for displaying a software exploration map for visualizing software product knowledge as shown in panel 640. As depicted, the user interface 600 includes a title bar 605 identifying the exploration map and a close icon 610 that may be used by the user to exit the application. The user interface 600 also includes navigation components: a back button 615, a forward button 620, a map button 625, a products button 630, and an administrator button 635. As shown in FIG. 6A, the map button 625 may be used to navigate to a display of the current exploration map loaded in the application. The products button 630 may be used to navigate a list of software products with available software exploration maps. A software product may be selected from the list to load a display of the software exploration map.

The admin button 635 may be used to navigate to an administrator user interface for the application. The administrator user interface may be used to view knowledge level reports of the users. For example, an administrator may review the knowledge levels of his employees, either individually or in a consolidated format. The administrator user interface may also allow an administrator to specify knowledge distribution quotas for feature areas (e.g., feature area A 645A, feature area B 645B, feature area N 645N). For example, the administrator may create a knowledge distribution quota specifying that there should be at least three experts among his employees in feature area A 645A, which would help ensure an expert is available if employees are on sick leave or vacation. In another example, the administrator may specify a predetermined portion of the activities in feature area A 645A that should be completed by a minimum quantity of users. After a knowledge distribution quota is created, a quota alert 648 may be presented to notify the user that additional experts are requested for a feature area (e.g., feature area B 645B). In this case, the user may be awarded with additional points or achievement badges for completing activities in the feature area with the quota alert 648.

In FIG. 6A, panel 640 shows three feature areas (e.g., feature area A 645A, feature area B 645B, feature area N 645N) that are displayed as geometric shapes. The geometric shapes are rendered to reflect the relative area knowledge levels of the user in the feature areas (e.g., feature area A 645A, feature area B 645B, feature area N 645N). In this example, feature area N 645N is darkest to show that the user's area knowledge level is highest in feature area N 645N, which is followed by a lower area knowledge level in feature area B 645B and a lowest area knowledge level in feature area A 645A. Panel 640 includes a zoom in button 646 and a zoom out button 647, which allow the user to navigate around the exploration map as if it was a geographic map. Further, the user may pan around the exploration map by selecting and dragging an unused portion of panel 640, which allows the user to explore different areas of the exploration map at the current zoom level. When the user zooms out completely, an overview of the feature areas (e.g., feature area A 645A, feature area B 645B, feature area N 645N) may be displayed as shown in FIG. 6A. The overview allows the user to quickly evaluate his knowledge level in each of the different feature areas (e.g., feature area A 645A, feature area B 645B, feature area N 645N) based on, for example, the shading of the feature areas (e.g., feature area A 645A, feature area B 645B, feature area N 645N).

In response to the user selecting the zoom in button 647 or selecting feature area A 645A, a zoomed in portion of the software exploration map focusing on feature area A 645A is shown in FIG. 6B. A knowledge level progress notification 650 is included that shows the user's currently selected employee role, the user's area knowledge level in the selected employee role, and the user's overall knowledge level in the currently selected software product. Employee roles may be configured by an administrator of the application, where an employee role specifies specific training requirements for users that have selected the employee role. For example, an employee role may specify that a user should complete all activities in feature area A 645A and feature area B 645B but none of the activities in feature area C 645C.

In FIG. 6B, within the geometric shape for feature area A 645A, activities are shown in an activity graph that includes an initial activity 652, a completed activity 655; uncompleted activities 660A, 660B, 660C, 660D; an activity with an associated description 665, and an expert activity 667. Each of the activities displayed in the activity graph also includes a label that briefly describes the corresponding activity. The initial activity 652 is labeled as 'START' and may be the recommended starting point for the user in the activity graph. The activity with an associated description 665 may be selected by the user to view a detailed description of the activity that includes the actions that should be performed by the user in the currently selected software product to complete the activity. The description may also include a link that may be selected to navigate the user to a relevant user interface of the currently selected software product. The expert activity 667 may be marked as completed after the user has completed all other activities in the activity graph, where completion of the expert activity 667 designates the user as an expert in feature area A 645A of the software product.

The foregoing disclosure describes a number of example embodiments for software exploration maps for visualizing software product knowledge. In this manner, the embodiments disclosed herein enable the knowledge level of users to be rapidly assessed to encourage users to increase their knowledge levels and to provide supervisors with knowledge level information that is useful for managing the skill sets of their personnel.

We claim:

1. A system comprising:
 a processor; and
 a non-transitory storage medium storing instructions executable on the processor to:
  obtain an interactive software exploration map comprising a plurality of feature areas, wherein each feature area of the plurality of feature areas is associated with a plurality of activities and a grouping of features in a software product, the plurality of feature areas comprising a first feature area comprising nodes representing user interface (UI) elements that are user activatable to control an operation of the software product;
  detect user selection, in the software exploration map, of a first activity of the plurality of activities associated with the first feature area;
  in response to the user selection of the first activity, navigate a user to a user interface of the software product, the user interface comprising the UI elements;
  detect completion of the first activity in the user interface of the software product by the user; and
  modify a knowledge level of the user in the first feature area based on the completion of the first activity.

2. The system of claim 1, wherein the instructions are executable on the processor to detect the completion of the first activity by:
 receiving an activity notification from the software product, wherein the activity notification describes a user interaction of the user with the user interface of the software product; and
 detecting the completion of the first activity based on the user interaction.

3. The system of claim 1, wherein the instructions are executable on the processor to detect the completion of the first activity by:
 using an application programming interface of the software product to detect a user interaction of the user with the user interface of the software product; and
 detecting the completion of the first activity based on the user interaction.

4. The system of claim 1, wherein the instructions are executable on the processor further to:
 generate a display of the software exploration map that includes the plurality of feature areas, wherein the first feature area of the plurality of feature areas includes a geometric shape that is rendered based on the knowledge level.

5. The system of claim 1, wherein the instructions are executable on the processor further to:
 obtain a knowledge distribution quota for the first feature area, wherein the knowledge distribution quota specifies a quantity of users that should complete a predetermined portion of the plurality of activities associated with the first feature area; and
 in response to determining that the knowledge distribution quota is not satisfied, generate a display of the software exploration map that includes a quota alert within a geometric shape representing the first feature area.

6. The system of claim 1, wherein the instructions are executable on the processor further to:
 generate a display of the first feature area that includes the plurality of activities associated with the first feature area, wherein each of the plurality of activities associated with the first feature area is rendered as a node in an activity graph that is within a geometric shape representing the first feature area.

7. The system of claim 1, wherein the instructions are executable on the processor further to:
 obtain an updated software exploration map for an updated version of the software product; and
 adjust the knowledge level of the user in the first feature area based on the updated software exploration map.

8. The system of claim 1, wherein the UI elements comprise user-selectable tabs of the user interface of the software product.

9. The system of claim 1, wherein the plurality of activities associated with the first feature area comprise user manipulation activities of the UI elements of the software product.

10. The system of claim 9, wherein the obtaining of the interactive software exploration map, the detecting of the user selection of the first activity, the navigating of the user to the user interface of the software product, the detecting of the completion of the first activity, and the modifying of the knowledge level of the user are performed as part of a training process instructing the user on use of the software product.

11. The system of claim 9, wherein the nodes are graph nodes connected by edges in the first feature area, and the graph nodes represent the user manipulation activities of the UI elements of the software product, and
 wherein the user selection, in the software exploration map, of the first activity is based on information provided by the graph nodes connected by the edges.

12. A method executed by a system comprising a processor, comprising:

generating a display of an interactive software exploration map that includes a plurality of feature areas of a software product, wherein each respective feature area of the plurality of feature areas includes a geometric shape that is rendered based on a knowledge level of the respective feature area, the plurality of feature areas comprising a first feature area including nodes representing user interface (UI) elements that are user activatable to control an operation of the software product;

detecting user selection, in the software exploration map, of a first activity of a plurality of activities associated with the first feature area of the plurality of feature areas;

in response to the user selection of the first activity, navigate a user to a user interface of the software product, the user interface comprising the UI elements;

detecting completion of the first activity in the user interface of the software product by the user; and modifying a knowledge level of the user in the first feature area based on the completion of the first activity.

13. The method of claim 12, wherein detecting the completion of the first activity comprises:

receiving an activity notification from the software product, wherein the activity notification describes a user interaction of the user with the user interface of the software product; and detecting the completion of the activity based on the user interaction.

14. The method of claim 12, further comprising:

obtaining a knowledge distribution quota for the first feature area, wherein the knowledge distribution quota specifies a quantity of users that should complete a predetermined portion of the plurality of activities; and in response to determining that the knowledge distribution quota is not satisfied, generating a display of the software exploration map that includes a quota alert within the geometric shape representing the first feature area.

15. The method of claim 12, wherein the plurality of activities associated with the first feature area comprise user manipulation activities of the UI elements of the software product.

16. The method of claim 15, wherein the generating of the display of the interactive software exploration map, the detecting of the user selection of the first activity, the navigating of the user to the user interface of the software product, the detecting of the completion of the first activity, and the modifying of the knowledge level of the user are performed as part of a training process instructing the user on use of the software product.

17. A non-transitory machine-readable storage medium encoded with instructions that upon execution cause a system to:

generate a display of an interactive software exploration map that includes a plurality of feature areas of a software product, wherein each feature area of the plurality of feature areas includes a geometric shape, the plurality of feature areas comprising a first feature area including graph nodes representing user interface (UI) elements that are user activatable to control an operation of the software product;

in response to a user selecting, in the software exploration map, a first activity of a plurality of activities associated with the first feature area, navigate the user to a user interface of the software product that is associated with the first feature area, the user interface comprising the UI elements;

detect completion of the first activity in the user interface of the software product by the user; and modify a knowledge level of the user in the first feature area based on the completion of the activity.

18. The non-transitory machine-readable storage medium of claim 17, wherein the graph nodes in the first feature area are connected by edges, and the graph nodes represent user manipulation activities of the UI elements of the software product, and wherein the user selection, in the software exploration map, of the first activity is based on information provided by the graph nodes connected by edges.

19. The non-transitory machine-readable storage medium of claim 17, wherein the plurality of activities associated with the first feature area comprise user manipulation activities of the UI elements of the software product.

20. The non-transitory machine-readable storage medium of claim 19, wherein the generating of the display of the interactive software exploration map, the navigating of the user to the user interface of the software product, the detecting of the completion of the first activity, and the modifying of the knowledge level of the user are performed as part of a training process instructing the user on use of the software product.

* * * * *